(12) United States Patent
Sendelbach et al.

(10) Patent No.: US 6,631,115 B1
(45) Date of Patent: Oct. 7, 2003

(54) METHOD, APPARATUS AND PROGRAM PRODUCT FOR BALANCING COMMUNICATION LOADS OVER A NETWORK

(75) Inventors: Lee Anton Sendelbach, Rochester, MN (US); Michael Edward Aho, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,994

(22) Filed: Jan. 28, 1999

(51) Int. Cl.[7] ............................................... G01R 31/08
(52) U.S. Cl. .................... 370/229; 370/229; 370/230; 709/203; 709/235
(58) Field of Search .......................... 710/119; 370/231, 370/517, 229, 230, 232, 233, 234, 235, 236, 237, 282, 278; 709/229, 203, 232, 233, 234, 235; 340/825

(56) References Cited

U.S. PATENT DOCUMENTS

| | | | | |
|---|---|---|---|---|
| 4,281,380 A | * | 7/1981 | DeMessa | 710/119 |
| 4,292,623 A | * | 9/1981 | Eswaran | 340/825 |
| 4,975,828 A | * | 12/1990 | Wishneusky et al. | 364/200 |
| 5,862,348 A | * | 1/1999 | Pedersen | 709/229 |
| 5,864,535 A | * | 1/1999 | Basilico | 370/231 |
| 6,338,091 B1 | * | 1/2002 | Desnoyers et al. | 709/235 |
| 6,424,993 B1 | * | 7/2002 | Weber | 709/203 |

OTHER PUBLICATIONS

Uyless Black, Computer Networks Protocols, Standards, and Interfaces, dated 1987, pp. 2–4 and 52–54.*

* cited by examiner

Primary Examiner—Douglas Olms
Assistant Examiner—Robert W. Wilson
(74) Attorney, Agent, or Firm—Wood, Herron & Evans LLP

(57) ABSTRACT

A method, apparatus, and program product for balancing communication loads between devices of a network comprises the introduction of a delay by a network device before responding to another network device which is sending an initiation signal for establishing communication between the devices. Based upon communication traffic of the second device, a delay occurs for a predetermined amount of time before the responding network device responds, and the delay is proportional to the amount of traffic handled by the responding device.

26 Claims, 2 Drawing Sheets

METHOD, APPARATUS AND PROGRAM PRODUCT FOR BALANCING COMMUNICATION LOADS OVER A NETWORK

FIELD OF THE INVENTION

This invention is generally related to computers and computer software, and more specifically is related to optimizing communications between computers of a network by balancing communication loads handled by such computers.

BACKGROUND OF THE INVENTION

Computer technology continues to improve in the field of computer networks or networking. Networking refers generally to the scenario wherein several different remote computers are electronically connected together to communicate with each other. For example, computer networks are used to provide direct communication links between computer users having a common interest, such as employees of a corporation. Such networks are generally referred to as local area networks (LAN) or wide area networks (WAN). More recently, large public networks, more commonly collectively known as the Internet, are being utilized by computer users to access and communicate with large numbers of remote users and other remote networks. Indeed, computers and other devices of all types and from all over the world are being connected together through appropriate networks. As a result, networking of an ever greater number of devices together over a LAN, WAN, or the Internet requires enhancement of existing networking capabilities to ensure rapid, error-free communications.

The computers or other devices connected together through a network can include any electronic device that has the proper hardware and software to be compatible with the requirements of the network. Personal computers (PC's) or workstations are usually one of the more prevalent devices coupled to and used on a network. Within a LAN or WAN, a server will also normally be utilized. A server is essentially a computer that can be used by a plurality of other remote computers, such as a plurality of PCs, or by a plurality of other remote devices, such as printers or disk drives, to further facilitate networking the various remote devices together. For larger networks, it is common to utilize multiple server computers to facilitate the operation of the network.

The processing speed of the network, and its ultimate usefulness, depends upon the ability of the various components or devices in the network to communicate with each other. The communication efficiency of the network servers is usually a particularly relevant factor, because the servers are often accessed by a large number of devices simultaneously. As the communication load on a server increases, the ability of that server to handle the communication tasks efficiently decreases. With multiple servers in a network, it would be desirable to balance the communication load over all of the servers so that one particular server is not overloaded. However, as discussed below, the prior art methods usually send network communication traffic predominantly to one server and then direct excess communication traffic to other servers only when the first server is overloaded.

The various devices of the network must communicate with each other, and therefore, each device must be able to understand each other device, even though the devices have different functions or are made by different manufacturers. In order to allow the various network devices to communicate with each other, networks such as LANs and WANs, use a common communications protocol which is shared by the various devices. A network communications protocol is a common set of hardware and software standards that must be implemented by the network devices so that they are linked together and can properly communicate or "talk" to each other and other devices over the network. Various different network protocols are available.

One suitable network protocol establishes a communication session between devices in the network utilizing test frames that are sent over the network. For example, a remote device, such as a personal computer, might send an initiation signal in the form of a test frame to another device on the network, such as a server, in order to initiate a communications session with that server, and ultimately with another device in the network through the server. Each initiation signal, or test frame, will generally include a source address that indicates the source of the test frame (i.e., the PC), and a destination address indicating the device to which the test frame is sent (i.e., a server). For certain network protocols, the addresses associated with the various devices are referred to as "Medium Access Control" addresses, or MAC addresses. In a particular network, multiple servers may share the same MAC address so that an initiation signal, in the form of a test frame, is sent to all of the multiple servers simultaneously. The destination devices, or servers, then answer the initiation test frame with a response signal, which could be in the form of another test frame. Generally, the computer which sends the initiation test frame will begin a communication session with the first server (of the multiple servers) from which it receives a response test frame. Due to signal propagation delays, and other delays associated with various electrical components in the system, such as network bridges and adapters, one particular server's response test frame will usually reach the initiating computer before the test frames of any of the other servers. The initiating computer will usually choose the first test frame it receives and will therefore begin a communication session with the server that sent the fastest response. As a result, in most networks, one of the servers will handle most of the communications sessions until that server becomes overloaded, and then another server will handle such excess communication sessions.

In other words, in a network in which a plurality of remote personal computers accesses a plurality of redundant servers through a network, a single server's test frames (response signals) are able to reach all remote computers first, and therefore that single server will maintain the significant portion of the communication load. The overloaded server then will not be able to process the network communications as rapidly as a server that is less utilized, and the network efficiency and speed is reduced.

In addition to imbalances between redundant servers of a network, there may also be imbalances in multiple paths to a single server. Specifically, multiple communication paths to a single server will each have characteristics that are associated with a communications workload. If one path has characteristics which make it the predominantly chosen path over other paths to a server, the path may become overloaded while other paths are underutilized. This may also reduce network efficiency.

As a result, there is a need for more efficient and rapid processing of network communications. More specifically, there is a need for balancing the communication load of a particular network over multiple devices or multiple communication paths. There is further need for accomplishing load balancing over a network without requiring significant changes to the network architecture or additional expensive network components. There is a still further need to achieve communication load balancing without significantly affecting the ongoing network communications.

SUMMARY OF THE INVENTION

The present invention addresses the above-referenced needs and other needs within the prior art by providing a method, apparatus, and program product for balancing communication loads over a network. In the network, one or more devices, such as PCs, are operable for sending initiation signals to other network devices, such as servers, in order to initiate communication with the servers. In accordance with the principles of the invention, the other network device, such as a server, sends a response signal in response to an initiation signal it receives. In that way, a communication session is established between the various network devices. Depending upon the communication traffic which is being handled by the responding device, the responding device may delay sending the response signal for a predetermined amount of time, based upon the communication traffic it is handling. In that way, communication traffic is balanced over the network, because the same responding device will not always send the quickest response to each initiation signal.

More specifically, in order to ensure that the same responding device does not provide the first response signal seen by various of the network devices trying to initiate a communication session, a responding network device will delay its response based upon the amount of traffic the responding device is currently handling. A delay occurs for a predetermined amount of time that is proportional to the communication traffic handled by the responding device. That is, as any particular responding device within a network handles more communication traffic in the form of additional communication sessions, the delay associated with that responding device will be longer. With each incremental change in communication traffic handled by the responding device, the delay will be further incremented. In that way, as a responding device handles a greater amount of network communication traffic, it will delay its response to initiation signals from other network devices, so that it does not receive as much new communication traffic. The new communication traffic is then spread to other responding network devices, such as other servers. The predetermined amount of time of the delay will continue to increment up to the full capacity of the responding device. In one embodiment of the invention, when the responding network device reaches full capactiy, it may add an additional delay to its already existing delay to further indicate to the network that the responding device is at full capacity.

In an alternative embodiment of the invention, no delay will occur until the responding device reaches its full capacity. To that end, a threshold might be set before any delay occurs at all. For example, a responding device in the network would not want to immediately delay its response if it is not handling any communications traffic. Therefore, a threshold level of communications traffic before the responding device would introduce a delay into its response scheme.

The present invention applies to devices within a network regardless of whether one device is inherently faster in responding to network initiation signals than other devices, or whether several or all of the devices have similar response speeds. In that way, the present invention may be utilized to progressively balance the communications traffic between the various network devices.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

The invention addresses the above-discussed needs and other issues associated with the prior art by providing an apparatus, program product, and method for balancing communication loads between devices of a network. An initiation signal is sent from a first computer in the network simultaneously to a plurality of other devices in the network for establishing communications between the first computer and the other devices. The devices could be other computers, such as multiple servers. Alternatively, the other devices might refer to multiple communication paths to another single device, such as a server. In response to the initiation signal from the first computer, the other devices send a response signal back to the first computer to begin a communication session. Based upon the communication capacity of the various other devices to which the initiation signal is sent, a delay may be introduced by one or more of the other devices before sending back a response signal.

The delay in sending the response signal by a particular device is set for a predetermined amount of time that is proportional to the communication traffic that is currently handled by the particular device. For the responding devices, such as servers, that are already handling a significant number of communication sessions, the delay will ensure that another device having less communication traffic thereon will respond more quickly with a response signal. In that way, the communication traffic in the network is balanced between the various devices, so that no single device is overloaded with communication traffic while other devices are not significantly utilized.

In one embodiment of the invention, the predetermined amount of time for the delay is incremented according to increments in the number of communication sessions handled by a particular device. That is, as the number of sessions handled by a device increases, the delay associated with that device will also increase. While servers are discussed extensively herein as examples of networked devices that will be handling a significant amount of network traffic, a person of ordinary skill in the art will also understand that other, non-server devices, such as other computers or other network communication paths, such as network bridges, may also be handling a large number of simultaneous communication sessions and thus will benefit from the invention, as well.

Hardware and Software Environment

Figure 1:
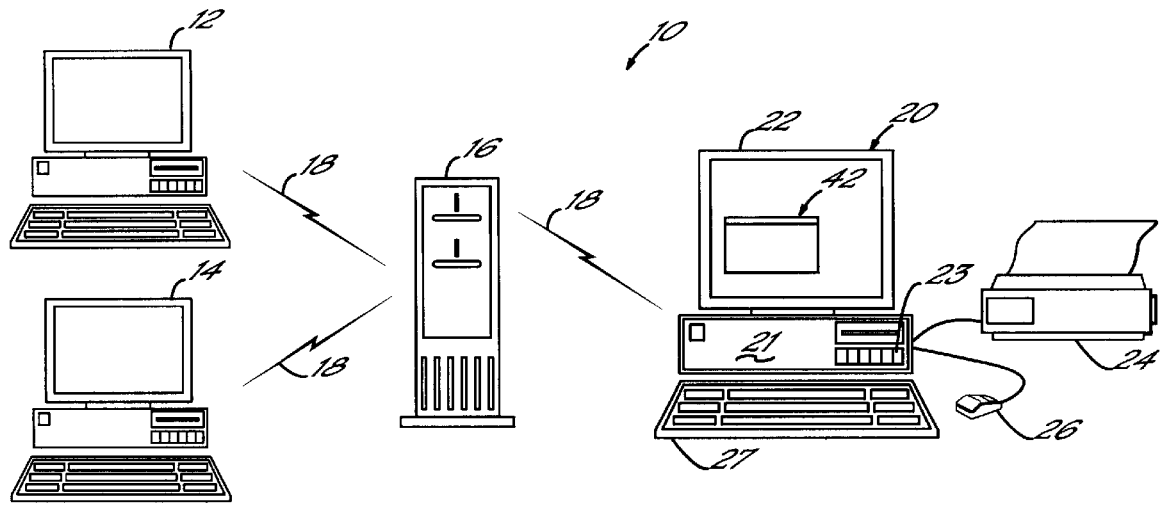
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client or remote computers 12, 14 and 20 (e.g., desktop or PC-based computers, workstations, etc.) coupled to server 16 (e.g., a PC-based server, a minicomputer, a midrange computer, a mainframe computer, etc.) through a network 18. Server 16 may also represent multiple servers in a network in accordance with the invention. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client or remote computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured as computer 20, albeit typically with greater processing performance and storage capacity, as is well known in the art.

Figure 2:
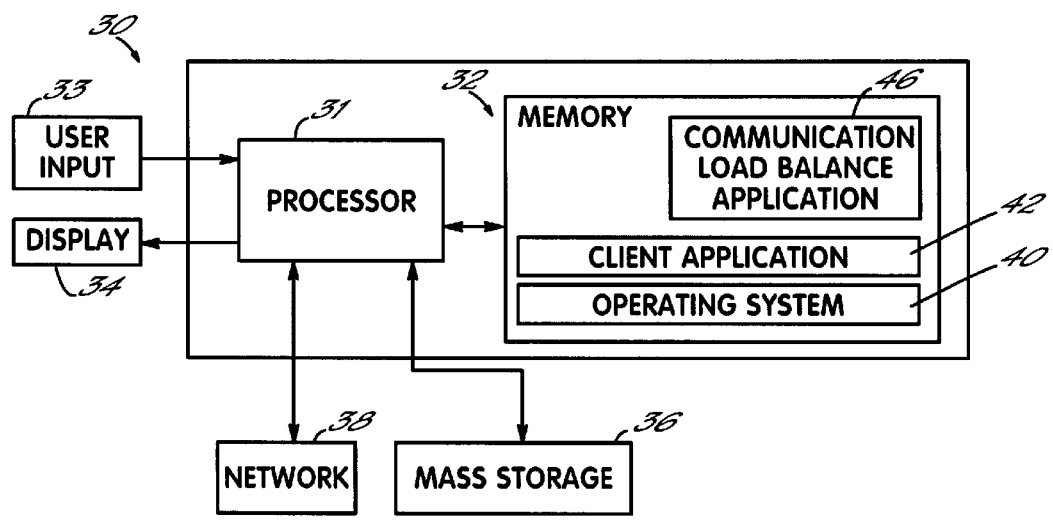
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client or remote computer (e.g., similar to computers 12, 14 and 20 of FIG. 1), a server computer (e.g., similar to server 16 of FIG. 1), a portable computer, an embedded controller, etc. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, using a server such as server 16, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., client application 42 and a PC Communication Load Balance application 46, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network. For example, in accordance with the principles of the invention, a computer handling multiple simultaneous communication sessions, such as a server 16, may execute the application 46 while a PC in the network executes the client application 42. Although both applications 42, 46 are shown in one computer 30 for illustrative purposes, it will be understood that the applications may generally be run by different computers, in accordance with the principles of the invention.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Communication Load Balance Application

Figure 3:
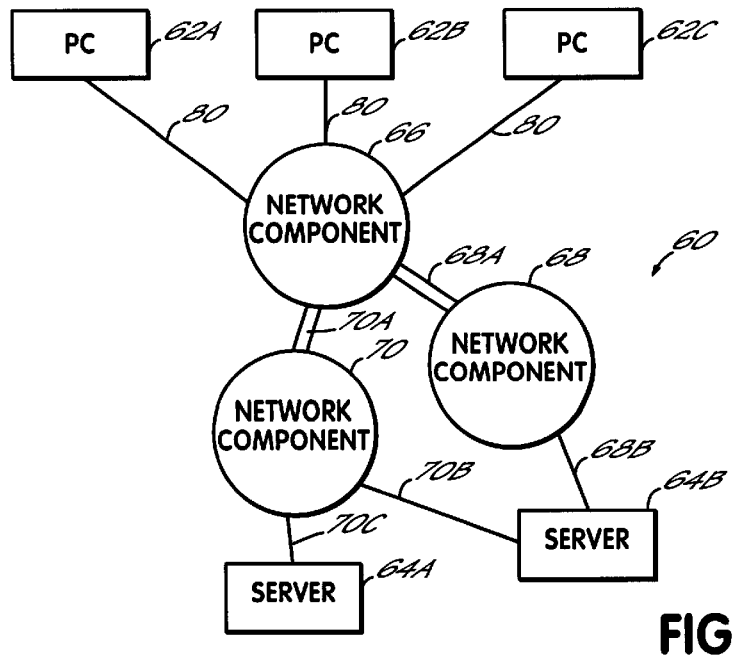
FIG. 3 is a block diagram of an exemplary network showing remote systems coupled with multiple servers for implementing the present invention.

FIG. 3 is a schematic diagram of one possible network for incorporating the present invention. It will be well understood by a person of ordinary skill in the art that networks utilizing the present invention may have an almost infinite variety of different configurations, and therefore, FIG. 3 is merely illustrative of one network which will be utilized primarily for the purposes of describing the invention. The invention is not exclusive to one type of network architecture.

Network 60 shows various devices coupled together and comprises a plurality of remote computers, such as PCs 62a, 62b, 62c which are coupled to a plurality of servers 64a, 64b. The servers, in turn, may be coupled to other remote networks or systems (not shown), and generally a plurality of any other compatible network devices might be networked with PCs 62a, 62b, and 62c. For coupling PCs 62a, 62b, 62c with the servers 64a, 64b, various network components or devices might be utilized. In FIG. 3, the network component 66 is coupled to other network components 68, 70 through appropriate network communication devices which form links, such as bridges 68a, 70a and adapters 68b, 70b, and 70c. The network components 66, 68, and 70 for example, might be suitable connection networks such as Token-Ring or Ethernet networks. For the example illustrated in FIG. 3, the various network components 66, 68, 70 are illustrated in circular fashion to indicate token-rings for describing one possible network utilizing the present invention.

To that end, token-ring 66 is coupled to the PCs 62a, 62b, 62c through appropriate communication devices 80 which form communication links, as is conventional in the art. The token-ring 66 containing the PCs is then coupled to token-rings 68, 70 through appropriate communication devices, such as bridges 68a, 70a. The token-ring 68, in turn, is coupled to server 64b through another network device, such as adapter 68b. The token-ring 70 is coupled to server 64b through an adapter device 70b, and to server 64a through an adapter device 70c. That is, the token-ring 68 is only coupled to a single server, while token-ring 70 is coupled to multiple servers and shares server 64b with token-ring 68. Each of the components in network 60, such as the PCs 62a, 62b, 62c and servers 64a, 64b is associated with a particular location or address within the network. The configuration of such an address will depend upon the communication protocol utilized within the network 60. Various different communication protocols are known to persons of ordinary skill in the art. One particular communication protocol utilizes Medium Access Control or MAC addresses for the various devices within the network 60. As discussed above, networks, such as network 60, may utilize redundant servers 64a, 64b for providing the necessary communication within the network. As a result, the various remote devices of the network may be communicating with one or more of the servers simultaneously. Such communications are termed herein as "communication sessions" which indicate that the remote devices and servers are transferring information back and forth. Such communication sessions will occur simultaneously, and therefore, one particular server, such as server 64a may be talking simultaneously to various different remote devices, such as PCs 62a, 62b, 62c.

Pursuant to the communication protocol used in network 60, an initiation signal may be sent from a remote PC to a server in order to initiate a communication session between the remote PC and the server. For some communication protocols, such an initiation signal might be termed a test frame. The server, in turn, answers the initiation signal with a response signal in order to begin a particular communication session. Such a response signal might simply be another test frame, depending upon the communication protocol. As discussed herein, the terms initiation signal and response signal may be any form of electronic communication which is utilized to establish a communication session between various devices on the network. In initiating a communication session, a PC, such as PC 62a, might send an initiation signal or test frame which is received by both servers 64a, 64b. Each of the servers will then generate a response signal, or test frame, which is responsive to the initiation signal. The remote PC 62a will then generally begin a communication session with the server associated with the first response signal it receives. Due to network architecture, such as the speed of the bridges 68a, 70a, speed of the adapters 68b, 70b, 70c and/or the amount of traffic which may be handled by the token-rings 66, 68 and 70, the time which elapses before a server receives an initiation signal and the initiating PC receives a response signal back from the server will vary. That is, response signals from server 64a, 64b which are responding to PC 62a will be received by PC 62a at different times. As noted, PC 62a will then generally set up a communication session with the server belonging to the first response signal which it receives. Due to the network architecture, one particular server or group of servers may be more directly coupled to the various remote systems 62a, 62b, 62c such that that server's response signals (or test frames) are able to reach all other remote devices first. As a result, that server will handle a significantly greater load of communication traffic than is handled by other servers. Once the particular server becomes close to its communication capacity or generally overloaded, another server may pick up the additional communication traffic. As a result, the balance of communication traffic between the various servers in the network is uneven, which decreases the efficiency of the network and also may slow down communications between the various remote devices of the network. The present invention addresses such a problem by equalizing the response capabilities of the various servers or other network components to offset any advantage one or more servers may have over other servers based upon the system architecture and the hardware components between the various devices of the network.

More specifically, each of the servers 64a, 64b will include a communication load balance program 90 which introduces delays in the responses of the server based upon the communication traffic currently handled by that server. Specifically, the communication load balance program will determine whether an initiation signal has been received from a remote system, such as a remote PC, as illustrated in Block 92. According to the communication protocol as discussed above, if no initiation signal has been received, the server does not need to send out a response signal and thus the program returns, as illustrated in Block 94. However, if an initiation signal has been received from a remote computer, a determination is made of the communication traffic currently being handled by the server, Block 96. The communication traffic information for the server is utilized to determine whether a delay must be introduced by the server before sending the response signal, or whether the response signal can be sent immediately.

In accordance with one aspect of the present invention, as the communication traffic is incremented, that is, as the number of communication traffic sessions handled by the server increases, the predetermined amount of time for the delay before responding is also incremented. The delay time is proportional to the amount of communication traffic handled by the server. In a preferred embodiment, a delay will not be necessary when the server is only handling a somewhat small number of communication sessions. Accordingly, a threshold is set, and the number of sessions must be above the threshold before the server will introduce a delay in sending the response signal back to the remote computer. As illustrated in Block 98, a test is made to determine if the number of communication sessions handled by the server is above the threshold amount. If it is not, the server immediately responds to the initiation signal and establishes a communication session, Block 100. The program then returns, Block 102.

However, if the number of communication sessions handled by the server is above the threshold level, the server will introduce a delay before sending the response signal, Block 104. The delay is for a predetermined amount of time and is utilized to balance communication traffic in the network, such as traffic between the two servers 64a, 64b illustrated in FIG. 3. Delaying the sending of the response signal from a busy server for a predetermined amount of time ensures that one particular server will not always respond first, before other servers in the network. This, in turn, allows communication sessions to be set up with various other servers to balance the communication traffic over the network. To that end, the predetermined amount of time which is chosen for the delay is proportional to the communication traffic which is currently being handled by the particular server that is generating the delay. That is, as the communication traffic handled by the server increases, the delay time associated with that server's response increases. In one embodiment of the invention, the predetermined amount of time for the delay will be incremented according to increments in the communication traffic handled by the server.

As one example, a network device, such as a server, might be able to handle a total or maximum, of 256 communication sessions. A delay could be set such that for each 16 sessions handled by the server, a 5 millisecond delay will occur before the server sends a response signal. For each additional 16 communication sessions handled by the server, the predetermined amount of time for the delay will be incremented another 5 milliseconds. As discussed above, it would be preferable not to introduce a delay when the server is handling a number of sessions which are below a particular threshold. For example, that threshold might be set at 32 sessions, such that any number of communication sessions between 0 and 32 handled by the server will be responded to immediately with a response signal, Block 100. If a server is handling 35 sessions, a delay of 5 milliseconds will be introduced before the response signal is sent. For any number of communication sessions from 33 to 48, a 5 millisecond delay will apply. For the next set of 16 communication sessions (49–64), an additional 5 millisecond delay (total of 10 millisecond delay) will be added. The delay is incremented in this example by 5 milliseconds for every 16 communication sessions exceeding the lower threshold of 32 sessions. As a further example, for any server which exceeds 64 communication sessions, a delay of approximately 5 milliseconds per 16 sessions will be introduced before the response signal is sent. In that way, other servers on the network with less than 64 communication sessions currently ongoing will pick up more communication sessions in order to balance the communication traffic in the network between the various servers of the network.

In that way, each of the servers will incrementally pick up communication traffic over time, and no one particular server will be overloaded. Assuming that the total communication sessions for a particular server on the network is 256, for example, a delay between 5 milliseconds and 70 milliseconds will be introduced by servers having communication sessions numbering between and including 33 and 256 sessions. With a five millisecond delay introduced with each additional 16 transmission sessions, a total of 70 milliseconds of delay is introduced at the maximum of 256 sessions handled by the server.

In accordance with another aspect of the present invention, another delay increment could be added before responding to initiation signals associated with communication sessions that would exceed the maximum limit. That is, if a particular server is full (i.e., all 256 sessions are utilized), the delay of, for example, 80 milliseconds (maximum of 70 milliseconds plus 10 milliseconds more) might be utilized before responding to the initiation signal. In that way, test frames from the full server will generally fail to arrive first at any remote PC. After the delay, the initiation signal is responded to, Block 106. The program then returns, Block 108.

Figure 4:
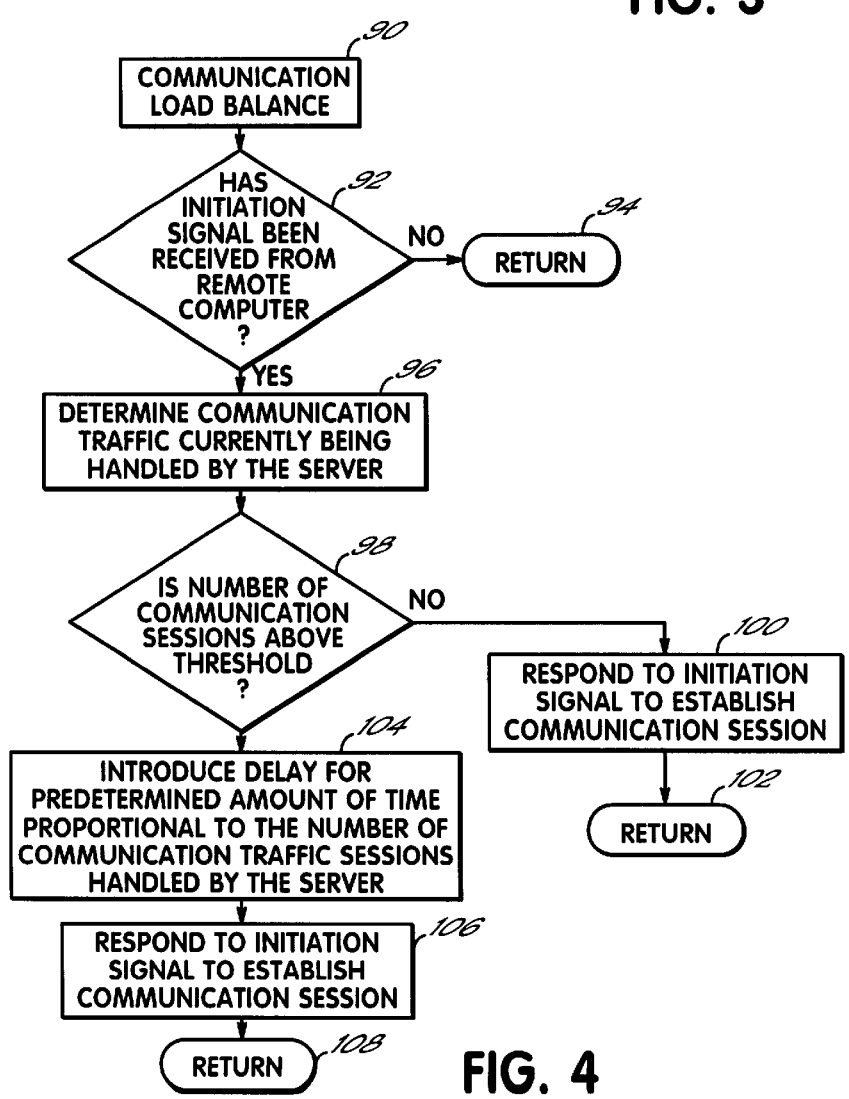
FIG. 4 is a flowchart illustrating the program flow of the communication load balance program of the invention.

With respect to this aspect of the invention, it may be desirable to introduce the delay only when the device, such as a server, reaches its full capacity. Referring to FIG. 4, the threshold of Block 98 might be set at the full capacity level for the device. The delay would then be introduced only when the device was at full capacity. The predetermined amount of time for the delay would be an amount selected as proportional and appropriate for the full capacity of the device. For example, a server handling less than a full capacity of 256 communication sessions might respond immediately to an initiation signal (Block 100). However, when the number of sessions reaches 256 (full capacity and also the threshold amount), the server would introduce a delay of 80 milliseconds.

It will readily be understood by a person of ordinary skill in the art that other delay schemes might be utilized in accordance with the principles of the present invention. For example, rather than introducing a 5 millisecond delay for each 16 communication sessions, a 10 millisecond delay might be introduced for each 32 additional communication sessions. That is, the delay will be incremented less, but in greater amounts as the number of communication sessions handled by the server increases. The predetermined amount of time for the delay can be tailored to a specific network or communication protocol in accordance with the principles of the invention. Furthermore, due to the operation of a particular server, not all servers on a network will need to have the same delay scheme. That is, to provide the most efficient balancing, one server may utilize one delay scheme while another server utilizes a different delay scheme. For example, server 64a might introduce delays of 5 milliseconds for each additional communication sessions handled by the server. However, server 64b might be operable to handle a greater number of communication sessions than server 64a. Thus, it may only be desirable to introduce delays of 5 milliseconds for each 32 additional communication sessions handled by server 64b. Furthermore, each of the servers 64a, 64b in a network might include different threshold amounts at which delay would be introduced. In that way, the communication load balance program of the present invention may be tailored for a specific network, or for the specific devices on the network in order to ensure a communication load balance in accordance with the principles of the present invention.

While the present invention addresses the issue of multiple network devices having different response times in order to balance the communication load over the devices, it is equally applicable to network devices having similar response speeds. That is, the invention can be utilized to balance communication loads over various devices regardless of whether there are disparities in their response capabilities. For example, the two servers 64a, 64b in FIG. 3 may be able to respond to a PC 62a at somewhat similar speeds. The invention would still be useful in such a scenario to progressively balance the communication loads handled by the servers as additional communication. Sessions are created. In that way, the invention is useful in balancing communication loads over all of the network devices, regardless of their response speeds relative to each other, and therefore, create an efficient network.

In accordance with one aspect of the present invention, the delay introduced prior to sending a response signal will generally be small enough that it should not affect any communication protocol timers associated with a particular communication protocol. Various communication protocols utilize timers to ensure a smooth flow of information between devices of a network. If no answer is forthcoming from a device, such as a server, to which an initiation signal was sent, the system may assume that the server is down. A very long delay before a response from a particular server might be interpreted as no response at all if the internal communication protocol timers time out. However, in accordance with the principles of the present invention, the maximum delay introduced preferably should not exceed the system timer. To that end, the amount of time introduced for the delay may be tailored for a specific network.

The embodiment of the invention described above uses servers as examples of network devices over which communication balancing may occur. However, other network devices may be implemented with the invention. For example, the network devices such as bridges 70a, 68a, or the adaptors 68b, 70b, 70c may utilize the invention. Referring to FIG. 3, server 64b is coupled to the network through two network devices or connections, symbolized by adaptors 68b and 70b. Each of the adaptors 68b, 70b is regarded as a separate communications device and path, and each of the adaptor devices imposes its own characteristics of a communications workload, even though both paths are to the same computer, i.e., server 64b. In accordance with the principles of the invention above, the communication load may be balanced over the two adaptor devices 68b, 70b by introducing delays associated with the adaptor devices proportional to the number of communication traffic sessions or other communication sessions handled by those adaptor devices, as set forth in FIG. 4. In that way, the invention is implemented between two communication path devices of the network, rather than between multiple computers, such as servers, of the network.

As such, in FIG. 4, the communication traffic currently handled by a network device other than a server, such as adaptor device 68b, is determined (Block 96). If the traffic or communication load is greater than a threshold (Block 98), a delay is introduced for the adaptor device 68b (Block 104). The delay is proportional to the communication load of the adaptor device 68b.

As discussed above, the invention can be used to balance communication loads over the adaptor devices 68b, 70b when the communication path associated with one device is faster than the other device, or where the two communication paths of the adaptors have somewhat similar speeds.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for balancing communication loads between devices of a network comprising:

sending an initiation signal from a first device in a network to a plurality of second devices in the network for establishing communications between the first device and at least one of the second devices;

in response to the initiation signal from the first device, sending response signals from various of the second devices to the first device;

based upon communication traffic of a particular second device, delaying the sending of the response signal from that second device for a predetermined amount of time to effectively prevent the establishment of communications between the first device and second devices that are handling high amounts of communication traffic to balance communication traffic in the network.

2. The method of claim 1 wherein at least one of the first and the second devices is a computer.

3. The method of claim 1 wherein one of the second devices is a server.

4. The method of claim 1 further comprising delaying the sending of the response signal from a second device for a predetermined amount of time which is proportional to the communication traffic handled by the particular second device.

5. The method of claim 4 further comprising incrementing the predetermined amount of time for the delay according to communication traffic increments for the particular second device.

6. The method of claim 5 further comprising incrementing the predetermined amount of time for the delay an additional increment when communication traffic handled by the particular second device reaches the capacity of that device.

7. The method of claim 1 wherein said delay is based upon the particular second device being approximately at a full communication capacity.

8. An apparatus for balancing communication loads between devices of a network comprising:

a first device operable to send an initiation signal;

a plurality of second devices operable, in response to the initiation signal from the first device, to send response signals to the first device for establishing communications between the first device and the second devices, the second devices including memory and programs resident in the respective memories;

the respective programs configured to delay sending respective response signals from the second devices for predetermined amounts of time based upon the communication traffic handled by the particular second devices in order to effectively prevent the establishment of communications between the first device and second devices that are handling high amounts of communication traffic to thereby balance communication traffic handled in the network.

9. The apparatus of claim 8 wherein at least one of the first and the second devices is a computer.

10. The apparatus of claim 8 wherein one of the second devices is a server.

11. The apparatus of claim 8 wherein the program is further configured to delay the sending of the response signal from a second device for a predetermined amount of time which is proportional to the communication traffic handled by the particular second device.

12. The apparatus of claim 11 wherein the program is further configured to increment the predetermined amount of time for the delay according to communication traffic increments for the particular second device.

13. The apparatus of claim 12 wherein the program is further configured to increment the predetermined amount of time for the delay an additional full increment when communication traffic handled by the second device reaches the full capacity of the particular second device.

14. The apparatus of claim 8 wherein said program is configured to delay sending the response signal based upon the particular second device being approximately at a full communication capacity.

15. An apparatus for balancing communication loads between devices of a network comprising:

a memory;

a program resident in memory and configured to send a response signal in response to an initiation signal from a networked device to establish communications between the apparatus and the networked device, the program further configured to delay sending the respective response signal for a predetermined amount of time based upon communication traffic handled by the apparatus to provide a response signal at a different time from another responding apparatus and thereby effectively prevent the establishment of communications with the networked device when the apparatus is handling high amounts of communication traffic to thereby balance the communication load handled by the apparatus in a network.

16. The apparatus of claim 15 wherein the apparatus is a server.

17. The apparatus of claim 15 wherein the program is further configured to delay the sending of the response signal for a predetermined amount of time which is proportional to the communication traffic handled by the apparatus.

18. The apparatus of claim 17 wherein the program is further configured to increment the predetermined amount of time for the delay according to communication traffic increments for the apparatus.

19. The apparatus of claim 18 wherein the program is further configured to increment the predetermined amount of time for the delay an additional full increment when communication traffic handled by the apparatus reaches the full capacity of the apparatus.

20. The apparatus of claim 15 wherein said program is configured to delay sending the response signal based upon the apparatus being approximately at a full communication capacity.

21. A program product for use in a networked device comprising:

a program;

a signal bearing media bearing the program;

the program configured to send a response signal from the networked device using the program in response to an initiation signal from another networked device to establish communications with the other networked device, the program further configured to delay sending the respective response signal for a predetermined amount of time based upon communication traffic of the networked device using the program to provide a response signal at a different time from other responding networked devices to thereby effectively prevent the establishment of communications between the networked device using the program and other networked devices to balance the communication load of a network.

22. The program product of claim 21 wherein the program is further configured to delay the sending of the response signal for a predetermined amount of time which is proportional to the communication traffic handled by the networked device using the program.

23. The program product of claim 21 wherein the program is further configured to increment the predetermined amount of time for the delay according to communication traffic increments for the networked device using the program.

24. The program product of claim 23 wherein the program is further configured to increment the predetermined amount of time for the delay an additional full increment when communication traffic handled by the networked device using the program reaches the full capacity of the media.

25. The program product of claim 21 wherein said program is configured to delay sending the response signal based upon the networked device using the program being approximately at a full communication capacity.

26. The program product of claim 21 wherein the signal bearing media comprises at least one of a recordable media and a transmission type media.

\* \* \* \* \*